United States Patent
Brahm et al.

(10) Patent No.: US 6,992,186 B2
(45) Date of Patent: *Jan. 31, 2006

(54) PROCESS FOR PREPARING LOW-MONOMER-CONTENT TDI TRIMERS

(75) Inventors: Martin Brahm, Odenthal (DE); Oswald Wilmes, Köln (DE); Joachim Simon, Düsseldorf (DE)

(73) Assignee: Bayer Aktiengesellschaft, Leverkusen (DE)

( * ) Notice: Subject to any disclaimer, the term of this patent is extended or adjusted under 35 U.S.C. 154(b) by 122 days.

This patent is subject to a terminal disclaimer.

(21) Appl. No.: 10/610,294

(22) Filed: Jun. 30, 2003

(65) Prior Publication Data

US 2004/0006228 A1    Jan. 8, 2004

(30) Foreign Application Priority Data

Jul. 3, 2002    (DE) ................................ 102 29 781

(51) Int. Cl.
    *C07D 251/34* (2006.01)
(52) U.S. Cl. ...................................... 544/222; 544/193
(58) Field of Classification Search ................ 544/193, 544/222
    See application file for complete search history.

(56) References Cited

U.S. PATENT DOCUMENTS

| 3,384,624 A | | 5/1968 | Heiss ........................... 528/49 |
| 3,996,223 A | | 12/1976 | Gupta et al. ................. 544/193 |
| 4,124,545 A | * | 11/1978 | Hocker et al. ............... 521/129 |
| 4,456,709 A | | 6/1984 | Richter et al. ............... 521/160 |
| 4,698,371 A | | 10/1987 | Werner et al. ............... 521/131 |
| 5,064,960 A | | 11/1991 | Pedain et al. ................ 544/222 |
| 5,606,004 A | * | 2/1997 | Brahm et al. ................. 528/73 |
| 5,723,564 A | | 3/1998 | Schmalstieg et al. ......... 528/73 |

FOREIGN PATENT DOCUMENTS

| DE | 712 840 | 10/1941 |
| DE | 1 201 992 | 9/1965 |
| DE | 34 20 923 | 12/1985 |
| GB | 1 458 564 | 12/1976 |
| JP | 56-59828 | 5/1981 |
| JP | 63-260915 | 10/1988 |
| JP | 2000-273142 | 10/2000 |

OTHER PUBLICATIONS

Houben-Weyl, vol. 8, (month unavailable) 1952, pp. 136-137, "Monomere Kohlensäurederivate" by S. Petersen.
J. prakt. Chem. 336 (month unavailable) 1994, pp. 185-200, "Zur Synthese aliphatischer Polyisocyanate—Lackpolyisocyanate mit Biuret-, Isocyanurate- oder Uretdionstruktur" by Hans Josef Laas et al.
Lackkunstharge, 5th ed., pp. 153-194, (month unavailable) 1971, "Polyadditionsharze" by Dr. Ernst Schneider.

* cited by examiner

*Primary Examiner*—Rabon Sergent
(74) *Attorney, Agent, or Firm*—Joseph C. Gil

(57) ABSTRACT

The invention relates to a novel process for preparing low-monomer-content trimers based on 2,4- and/or 2,6-diisocyanatotoluene (TDI). A catalytic trimerization is carried out in a mixture of from 20 to 80% by weight of a diisocyanate component containing at least 80% by weight of 2,4- and/or 2,6-diisocyanatotoluene, from 20 to 80% by weight of solvent, and 0–20% by weight of an alcohol component, and also phenolic catalysts containing dialkylamino-methyl groups. In the course of ongoing trimerization, in one or more steps, additional monomeric 2,v4-diisocyanatotoluene is metered in.

7 Claims, No Drawings

PROCESS FOR PREPARING LOW-MONOMER-CONTENT TDI TRIMERS

CROSS REFERENCE TO RELATED APPLICATIONS

The present application claims the right of priority under 35 U.S.C. § 119 (a)–(d) of German Patent Application No. 10229781.9 filed Feb. 7, 2003.

FIELD OF THE INVENTION

The invention relates to a novel process for preparing low-monomer-content trimers based on 2,4- and/or 2,6-diisocyanatotoluene (TDI).

BACKGROUND OF THE INVENTION

The preparation of polyisocyanates containing isocyanurate groups has been known for a long time and is described in a large number of publications (e.g. Houben-Weyl, Methoden der organischen Chemie Volume 8, p. 136 ff., Georg Thieme verlag Stuttgart 1952; H. Wagner, H. F. Sarx, Lackkunstharze 5th Edition, page 153 ff., Carl Hanser Verlag Munich 1971; DE-A 4 428 107, U.S. Pat. No. No. 2,993,870; DE-A 1 201 992; DE-A 2 452 532; J. prakt. Chem. 336, pp. 185-200, 1994). Both trimers based on aliphatic and trimers based on aromatic diisocyanates are employed universally as paint base materials and also as polyurethane elastomers and polyurethane foams.

From an occupational hygiene standpoint low-monomer-content trimer product grades are preferred. These products are prepared either by distillative separation of the excess monomer after the trimerization reaction or by stirring the trimerization reaction toward high conversions, until the monomer has very largely undergone conversion to higher-oligomer isocyanurates. The latter method is preferentially successful when the diisocyanates used carry two isocyanate groups which differ in their reactivity, as in the case of 2,4-toluene diisocyanate. Solvent-containing products of this kind can be prepared in this way with a monomeric TDI (sum of the isomeric toluene diisocyanates) content of <0.5% (e.g. ®Desmodur IL, commercial product of Bayer AG, 50% in butyl acetate, NCO content: 8.0%).

As a result of the tightening in the labelling of TDI-based products, interest in substantially monomer-free grades, i.e. products having TDI contents of <0.1%, has come sharply to the fore. In order to achieve this aim, the starting base materials of TDI-based coating systems ought to contain substantially <0.5% by weight TDI, preferably <0.1% by weight.

In principle, this objective can be achieved simply by continuing trimerization to even higher conversions and thus even higher molecular weights. On the one hand, however, this is at the expense of a low viscosity, and on the other hand this approach leads to products having fewer and fewer reactive isocyanate groups. Moreover, this measure is increasingly influencing compatibility in the case of blending with other paint base materials.

There has, however, been no lack of attempts to reduce the monomer content in other ways.

The use of non-solvents for trimers in order to shift the equilibrium is described in, for example, JP-A 56 059 828. Distillation processes for "thin-filmed TDI trimers" (e.g. DE-A 3 420 923, DE-A 19 618 230, DE-A 712 840) and processes which employ a pretreatment or aftertreatment stage, such as subsequent urethanization, for example, are known (e.g. DE-A 3 928 503, U.S. Pat. No. 3,384,624, DE-A 2 414 413, DE-A 19 523 657, DE-A 19 523 657; JP-A2 000 273 142). Even particularly gentle processes for selective trimerization at low temperatures are discussed (JP-A 63 260 915). All of the methods described, however, lead to very complex, often multistage, industrial processes, are associated with very long reaction times and hence a poor space/time yield, and/or cannot be transferred from the laboratory stage to the industrial scale.

SUMMARY OF THE INVENTION

It is an object of the present invention, therefore, to provide a simple process for preparing substantially monomer-free TDI trimer solutions without the need for additional process steps or an additional physical separation of monomeric TDI.

This object has been achieved with the process of the invention, described in more detail below.

The invention provides a process for preparing solvent-containing polyisocyanates based on 2,4- and/or 2,6-diisocyanatotoluene which contain isocyanurate groups and <0.1% by weight of monomeric diisocyanate characterized in that in a mixture of A) from 20 to 80% by weight of a diisocyanate component containing at least 80% by weight of 2,4- and/or 2,6-diisocyanatotoluene,
B) from 20 to 80% by weight of solvent and
C) 0–20% by weight of an alcohol component, and also
D) phenolic catalysts containing dialkylaminomethyl groups, at a temperature from 20° C. to 120° a catalytic trimerization reaction is carried out and in the course of ongoing trimerization additionally 0.1–25% by weight, based on the amount of diisocyanates employed, of monomeric 2,4-diisocyanatotoluene is metered in in one or more steps and subsequently, where appropriate by adding catalyst poisons (stopping), the reaction is ended.

DETAILED DESCRIPTION OF THE INVENTION

As used herein, unless otherwise expressly specified, all of the numerical ranges, amounts, values and percentages such as those for amounts of materials, times and temperatures of reaction, ratios of amounts, values for molecular weight, and others in the following portion of the specification may be read as if prefaced by the word "about" even though the term "about" may not expressly appear with the value, amount or range.

The process of the invention is apparently in contradiction with the objective aim of minimizing the residual monomer content of the products. The view which generally exists is that prolonging the reaction time ought to increase the monomer conversion—while a curtailment ought to bring about the opposite. Where further monomer is metered in during the reaction, therefore, only a shortened reaction time should be available to a portion of the monomers—and, consequently, the monomer content ought comparatively to tend to rise. Experimentally, however, it has been found that the metered addition of additional 2,4-diisocyanatotoluene leads to a marked reduction in the residual monomer fraction to <0.1% by weight TDI.

The process of the invention is used to prepare polyisocyanate solutions containing isocyanurate groups and <0.10% by weight of free TDI, preferably <0.05% by weight of free TDI.

In the process of the invention the amount of the monomeric 2,4-diisocyanatotoluene metered in additionally in the course of ongoing trimerization is preferably 10–20% by weight, with more preference 1–10% by weight, based on the amount of diisocyanates employed.

As diisocyanate component A) it is possible in accordance with the invention to use compounds containing isocyanate groups, and mixtures thereof, containing at least 80% by weight, preferably at least 90% by weight, of 2,4- and/or 2,6-diisocyanatotoluene. More preference is given to using 2,4- and/or 2,6-diisocyanatotoluene, preferably not in a blend with other isocyanate components.

Besides 2,4- and/or 2,6-diisocyanatotoluene, the isocyanate component A) may also include:

monoisocyanates having aliphatically, cycloaliphatically, araliphatically or aromatically attached isocyanate groups such as, for example, stearyl isocyanate, naphthyl isocyanate;

diisocyanates having aliphatically, cycloaliphatically, araliphatically and/or aromatically attached isocyanate groups, such as, for example, 1,4-diisocyanatobutane, 1,6-diisocyanatohexane (HDI), 2-methyl-1,5-diisocyanatopentane, 1,5-diisocyanato-2,2-dimethylpentane, 2,2,4- or 2,4,4-trimethyl- 1,6-diisocyanatohexane, 1,10-diisocyanatodecane, 1,3- and 1,4-diisocyanatocyclohexane, 1,3- and 1,4-bis(isocyanatomethyl)cyclohexane, 1-isocyanato-3,3,5-trimethyl-5-isocyanatomethylcyclohexane (isophorone diisocyanate, IPDI), 4,4'-diisocyanatodicyclohexylmethane, 1-isocyanato-1-methyl-4(3)-isocyanatocyclohexane (IMCI), bis(isocyanatomethyl) norbornane, 2,4- and 2,6-diisocyanatotoluene (TDI), 2,4'- and 4,4'-diisocyanatodiphenyl-methane and higher homologs, 1,5-diisocyanatonaphthalene, dipropylene glycol diisocyanate;

triisocyanates and/or isocyanates of higher functionality, such as, for example, 4-isocyanatomethyl- 1,8-octane diisocyanate (nonane triisocyanate), 1,6,11-undecane triisocyanate or any desired mixtures of such isocyanate compounds.

Besides TDI in the mixture as isocyanate component A) it is likewise possible to employ what are called modified isocyanate compounds which are derived from the above-mentioned diisocyanates and triisocyanates and are prepared by means of oligomerization reactions such as, for example, urethanization, biuretization, allophanatization or trimerization.

Particular preference is given to using a mixture of the isomeric 2,4- and 2,6-tolylene diisocyanates, in particular a mixture of 75 to 85% by weight 2,4-TDI and 25 to 15% by weight 2,6-TDI. In this mixture the weight ratio 2,4:2,6-TDI is preferably 3:2 to 9:1.

As solvents B) it is possible to use diluents commonplace in polyurethane chemistry, such as, for example, toluene, xylene, cyclohexane, chlorobenzene, butyl acetate, ethyl acetate, ethylglycol acetate, pentyl acetate, hexyl acetate, methoxypropyl acetate, tetrahydrofuran, dioxane, acetone, N-methylpyrrolidone, methyl ethyl ketone, white spirit, aromatics with higher degrees of substitution, such as those sold under the name Solvent Naphtha®, Solvesso®, Shellsol®, Isopar®, Nappar® and Diasol®, heavy benzene, tetralin, decalin and alkanes having more than 6 carbon atoms, customary plasticizers, such as phthalates, sulfonates and phosphates, and also mixtures of such solvents. The concentration of the solvent here is set at from 20 to 80% by weight, preferably from 40 to 60% by weight.

Of further suitability as solvents B) are polyisocyanates based on aliphatic diisocyanates as described in DE-A 4 428 107 and DE-A 506 004. By this means it is possible to obtain dilute, low-monomer-content TDI trimers which contain no readily evaporable solvents.

Suitable catalysts C) for initiating and accelerating the trimerization reaction include special systems which lead to selective incorporation of TDI even at relatively high temperatures. Catalyst systems of this kind have phenolic OH groups and N,N-dialkylaminomethyl groups attached to aromatics (alkyl: $C_1$-$C_3$ alkyl chain and/or alkylene chain having 1 to 18 carbon atoms which may be separated by oxygen or sulphur).

These groups may be distributd over two or more molecules or may be sited on one or more aromatics. As catalyst systems it is preferred to use compounds which contain both hydroxyl groups and dialkylaminomethyl groups in one molecule.

Particular preference is given to using systems whose $C_1$-$C_3$ dialkylaminomethyl groups are positioned ortho to aromatic hydroxyl groups.

Examples that may be mentioned include the following Mannich bases, as obtained, for example, on the basis of phenol, p-isononylphenol or bisphenol A by reaction with dimethylamine and formaldehyde in accordance, for example, with DE-A 2 452 531 or Synth.Commun. (1986), 16, 1401–9.

The trimerization reaction of the invention is conducted at temperatures from 20 to 120° C. preferably from 50 to 80° C.

Critical to the invention is the single or, where appropriate, repeated additional addition of 2,4-diisocyanatotoluene to the reaction phase during the trimerization reaction, resulting in a significantly reduced residual TDI content in the product. The 2,4-diisocyanatotoluene here may be pure, may be present as a mixture with other diisocyanate components A) of the invention, or else may be in solution in a solvent B) according to the invention.

The diisocyanate is normally added on reaching TDI residual monomer contents of less than 5% by weight, preferably less than 2% by weight and with particular preference less than 1% by weight, it being preferred to add less than 10% by weight and with particular preference less than 5% by weight, based on the total amount of diisocyanate component monomer used. The residual monomer content can be determined by gas chromatography. Experimentally it is also possible to determine a correlation curve for the connection between residual monomer content and NCO content.

The catalysts D) are employed as pure substances or in solution, where appropriate in two or more small portions or continuously. For the preparation overall use is made of 0.003 to 2.0% by weight, preferably from 0.01 to 0.5% by weight, of active catalyst D). The reaction time is generally between 1 and 100 hours, preferably 10 and 25 hours. The temperature is preferably 50–80° C.

The trimerization reaction is preferably stopped at the end by adding a catalyst poison such as protic acids, acid chlorides or methylating compounds, such as methyl toluenesulfonate, for example.

In the course of inventive trimerization of TDI it is surprisingly observed that when monomeric diisocyanate is added additionally—preferably 2,4-TDI—the final TDI content of the polyisocyanate does not increase but instead falls. With this process it is possible surprisingly to prepare substantially monomer-free TDI trimer solutions.

Moreover, after the end of the trimerization reaction, the reaction product may be modified further with low molecular mass and/or polymeric hydroxyl-containing compounds.

The polyisocyanates prepared by the process of the invention are useful coating materials which can be cured under the influence of atmospheric moisture. They may likewise find use in or for producing adhesion promoters, adhesives, printing inks, sealants and polyurethane mouldings.

With particular preference they are used as crosslinkers in 2-component systems with isocyanate-reactive compounds that are known per se. These include, for example, hydroxy-functional polyethers, polyesters, polyamides, polycarbonates, polyacrylates, polybutadienes, and hybrid forms of the hydroxy-functional polymers stated.

Low molecular mass diols and polyols, dimer fatty alcohols and trimer fatty alcohols, and amino-functional compounds can also find use in 2K (two-component) systems.

With blocked isocyanate-reactive compounds it is also possible to formulate one-component systems; similarly, the products produced by the process of the invention may also be used in blocked form as or in coating materials. In this case drying takes place at relatively high temperatures up to about 200° C.

Besides the process products of the invention, other auxiliaries and additives may be used in the coatings as well, such as, for example, the customary wetting agents, levelling agents, anti-skinning agents, anti-foam agents, solvents, matting agents such as silica, aluminium silicates and high-boiling waxes, viscosity regulators, pigments, dyes, UV absorbers, and stabilizers against thermal and oxidative degradation.

The coating materials obtained may be used to coat any desired substrates such as, for example, wood, plastics, leather, paper, textiles, glass, ceramic, plaster, masonry, metals or concrete.

They can be applied by customary application methods such as spraying, brushing, flooding, pouring, dipping and rolling. The coating materials may be used in the form of clearcoat materials and also in the form of pigmented paints.

The coatings produced from the products of the invention cure at 20° C. generally over a period of a few minutes to hours to form high-quality coatings. Alternatively, curing can be effected at lower temperatures (to −5° C.) or in accelerated form at higher temperatures up to 200° C.

EXAMPLES

All figures given as "parts" and "%" are by weight. NCO contents were determined, as known to the skilled worker, by titration.

Comparative Example 1

In a stirred apparatus, 500 g of butyl acetate and 500 g of Desmodur® T80 (mixture of 80% 2,4-diisocyanatotoluene and 20% 2,6-diisocyanatotoluene) at 50° C. were admixed continuously with 4.4 g of catalyst solution (dilution (40% in butyl acetate) of a 35% strength solution of a Mannich base based on bisphenol A/dimethylamine in xylene) and stirred. The batch was stirred until the NCO content had fallen to 8.0%. To end the trimerization reaction the resultant product was admixed with 1.5 times the amount by weight (based on added catalyst amount) of methyl toluenesulfonate and heated at 80° C. for one hour. The solids content was adjusted to 50% by adding solvent. The product has the following characteristics:

| | |
|---|---|
| NCO content: | 8.0% |
| Solids content: | 50% |
| Viscosity at 23° C.: | 1100 mPas |
| fr. TDI content: | 0.30% (determined by means of GC) |

Comparative Example 2

In a stirred apparatus, 500 g of butyl acetate and 500 g of Desmodur® T80 (mixture of 80% 2,4-diisocyanatotoluene and 20% 2,6-diisocyanatotoluene) at 50° C. were admixed continuously with 4.5 g of catalyst solution (Mannich base based on phenol/dimethylamine, 80% in butyl acetate) and stirred. The batch was stirred until the NCO content had fallen to 8.0%. To end the trimerization reaction the resultant product was admixed with 1.5 times the amount by weight (based on added catalyst amount) of methyl toluenesulfonate and heated at 80° C. for one hour. The solids content was adjusted to 50% by adding solvent. The product has the following characteristics:

| | |
|---|---|
| NCO content: | 8.0% |
| Solids content: | 50% |
| Viscosity at 23° C.: | 1400 mPas |
| ft. TDI content: | 0.53% (determined by means of GC) |

Example 1

Process According to the Invention

In a stirred apparatus, 500 g of butyl acetate and 500 g of Desmodur® T80 (mixture of 80% 2,4-diisocyanatotoluene and 20% 2,6-diisocyanatotoluene) at 50° C. were admixed continuously with 5.9 g of catalyst solution (dilution (40% in butyl acetate) of a 35% strength solution of a Mannich base based on bisphenol A/dimethylamine in xylene) and stirred. At NCO levels of 10.45% and at 8.7% there were added in succession first 40 g and then 20 g of 2,4-diisocyanatotoluene.

The batch was catalyzed further and stirred until the NCO content had fallen to 8.0%. To end the trimerization reaction the resultant product was admixed with 1.5 times the amount by weight (based on added catalyst amount) of methyl toluenesulfonate and heated at 80° C. for one hour. The solids content was adjusted to 50% by adding solvent. The product had the following characteristics:

| | |
|---|---|
| NCO content: | 8.0% |
| Solids content: | 50% |
| Viscosity at 23° C.: | 1300 mPas |
| ft. TDI content: | 0.05% (determined by means of GC) |

Example 2

Process According to the Invention

In a stirred apparatus, 500 g of butyl acetate and 500 g of Desmodur® T80 (mixture of 80% 2,4-diisocyanatotoluene and 20% 2,6-diisocyanatotoluene) at 50° C. were admixed continuously with 6.17 g of catalyst solution (dilution (40% in butyl acetate) of a 35% strength solution of a Mannich base based on bisphenol A/dimethylamine in xylene) and stirred. At an NCO content of 9.05% there were added 30 g of 2,4-diisocyanatotoluene. The batch was catalyzed further and stirred until the NCO content had fallen to 8.0%. To end the trimerization reaction the resultant product was admixed with 1.5 times the amount by weight (based on added catalyst amount) of methyl toluenesulfonate and heated at 80° C. for one hour. The solids content was adjusted to 50% by adding solvent. The product had the following characteristics:

| | |
|---|---|
| NCO content: | 8.0% |
| Solids content: | 50% |
| Viscosity at 23° C.: | 1500 mPas |
| fr. TDI content: | 0.09% (determined by means of GC) |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Process for preparing solvent-containing polyisocyanates based, at least in part, on 2,4- and/or 2,6-diisocyanatotoluene which contain isocyanurate groups comprising
    a) reacting, at a temperature from 20° C. to 120° C., a mixture of
        A) from 20 to 80% by weight, based on the mixture, of a diisocyanate component containing at least 80% by weight, based on all diisocyanates, of 2,4- and/or 2,6-diisocyanatotoluene,
        B) from 20 to 80% by weight, based on the mixture, of solvent and
        C) 0–20% by weight, based on the mixture, of an alcohol component, and also
        D) phenolic catalysts containing dialkylaminomethyl groups;
    b) metering in, in one or more steps, in the course of ongoing trimerization additionally 0.1–25% by weight, based on the amount of diisocyanates employed, of monomeric 2,4-diisocyanatotoluene, wherein at least a portion of the 2,4-diisocyanatotoluene is added after the NCO content in the mixture of a) as been reduced due to the reaction of A); and
    c) ending the reaction by adding catalyst poisons; wherein the reacted mixture contains <0.1% by weight, based on the mixture, of monomeric diisocyanate.

2. Process according to claim 1, wherein the amount of the monomeric 2,4-diisocyanatotoluene metered in additionally in the course of ongoing trimerization is from 10 to 20% by weight.

3. Process according to claim 1, wherein the amount of the monomeric 2,4-diisocyanatotoluene metered in additionally in the course of ongoing trimerization is from 1–10% by weight.

4. Process according to claim 1, wherein catalysts are employed which contain in one molecule both dialkylaminomethyl groups (alkyl =C1 to C3 chain) and phenolic OH groups.

5. Process according to claim 4, wherein catalysts are used which contain Mannich bases which are obtained from phenol, p-isononylphenol or bisphenol A by reaction with dimethylamine and formaldehyde.

6. Process according to claim 1, wherein the trimerization is conducted at a temperature from 50 to 80° C.

7. Process according to claim 1, wherein a mixture of 2,4- and 2,6-diisocyanatotoluene (TDI) in a weight ratio of from 3:2 to 9:1 2,4-TDI:2,6-TDI is used as starting diisocyanate.

* * * * *